US012611895B2

(12) United States Patent

Onillon

(10) Patent No.: US 12,611,895 B2

(45) Date of Patent: Apr. 28, 2026

(54) INFLATION METHOD FOR A VEHICLE PROVIDED WITH A CENTRALISED TYRE INFLATION SYSTEM

(71) Applicant: TELEFLOW SAS, Mably (FR)

(72) Inventor: Vincent Onillon, Mably (FR)

(73) Assignee: TELEFLOW SAS, Mably (FR)

( * ) Notice: Subject to any disclaimer, the term of this patent is extended or adjusted under 35 U.S.C. 154(b) by 38 days.

(21) Appl. No.: 18/872,731

(22) PCT Filed: May 4, 2023

(86) PCT No.: PCT/EP2023/061771

§ 371 (c)(1),
(2) Date: Dec. 6, 2024

(87) PCT Pub. No.: WO2023/237260

PCT Pub. Date: Dec. 14, 2023

(65) Prior Publication Data

US 2025/0367983 A1      Dec. 4, 2025

(30) Foreign Application Priority Data

Jun. 7, 2022    (FR) ..................................... 2205459

(51) Int. Cl.
B60C 23/00          (2006.01)

(52) U.S. Cl.
CPC ................................. B60C 23/008 (2013.01)

(58) Field of Classification Search
CPC ..... B60C 23/00; B60C 23/003; B60C 23/008; B60C 23/04; B60C 23/16
USPC .......................................................... 701/36
See application file for complete search history.

(56) References Cited

U.S. PATENT DOCUMENTS

| | | | |
|---|---|---|---|
| 10,099,518 B2 * | 10/2018 | King | B60C 23/00354 |
| 10,675,924 B2 * | 6/2020 | Milburn, Jr. | B60C 23/0401 |
| 11,707,950 B2 * | 7/2023 | Steiner | B60C 23/04 |
| | | | 702/179 |
| 2013/0293371 A1 | 11/2013 | Patel et al. | |
| 2013/0325261 A1 | 12/2013 | Hansen et al. | |
| 2017/0080761 A1 | 3/2017 | King et al. | |

OTHER PUBLICATIONS

International Search Report dated Jul. 11, 2023.

* cited by examiner

*Primary Examiner* — Andrew Joseph Rudy
(74) *Attorney, Agent, or Firm* — IPSILON USA, LLP

(57)          ABSTRACT

A method is provided for adjusting the tyre pressure of a vehicle by means of a central tyre inflation system, CTIS. The vehicle has at least a first group and a second group of tyres (EM i), each group (EM i) having at least one tyre; each group (EM i) having an initial pressure (P0 i); and a predetermined target pressure (P1 i) corresponding to each group (EM i). The method includes carrying out a sequence for adjusting the pressure of each group (EM i) from the initial pressure (P0 i) to the target pressure (P1 i). The sequence has at least one increment (DG i-j) for each group (EM i); each increment (DG i-j) being defined by an air volume (Vi-j) to be added to the tyres of the group (EM i). The sequence includes adjusting the pressure of the groups (EM i) increment by increment (DG i-j), by switching to another group (EM i) once one increment (DG i-j) has been carried out until each group (EM i) has reached its target pressure (P1 i).

12 Claims, 1 Drawing Sheet

[Fig. 1]
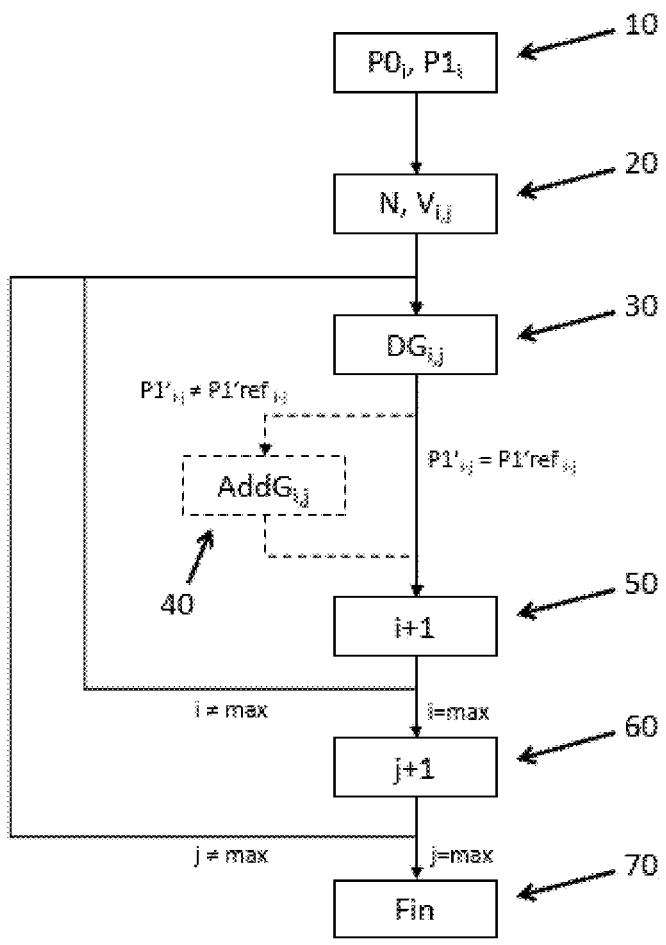
[Fig. 2]
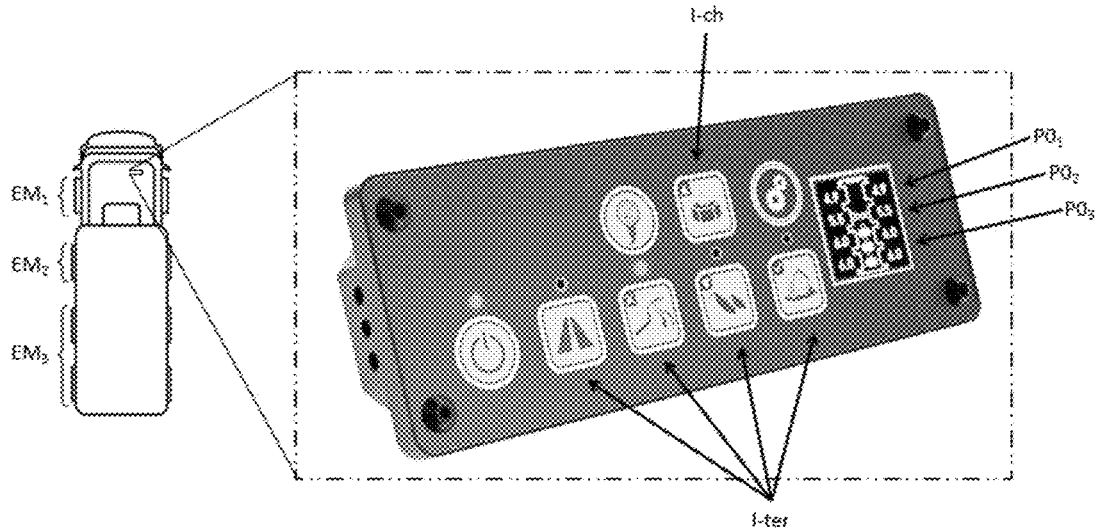

INFLATION METHOD FOR A VEHICLE PROVIDED WITH A CENTRALISED TYRE INFLATION SYSTEM

RELATED APPLICATION

This application is a National Phase of PCT/EP2023/061771 filed on May 4, 2023, which claims priority to French Patent Application No. 22 05459 filed on Jun. 7, 2022, the entirety of which are incorporated by reference.

TECHNICAL FIELD

The invention relates to the technical field of central tyre inflation systems (CTIS) for a vehicle.

PRIOR ART

The prior art discloses CTIS for adjusting the pressure in the tyres of the wheels of a vehicle when said pressure has to be adapted to the driving conditions.

For example, the tyre pressure in a vehicle travelling on soft ground should be low so as to maximise grip and allow the vehicle to move forward.

Once the soft ground has been passed, the tyre pressure should be increased so that the vehicle can travel at a higher speed, for example when the vehicle joins a road.

CTIS typically include swivel joints for connecting each vehicle tyre to a compressed-air source and to an outflow. It is therefore possible to both increase and decrease the tyre pressure without having to handle individual pneumatic elements. In particular, the pressure can be adjusted while the vehicle is in motion.

In the process, the swivel joints undergo wear, which can be amplified by heat produced at said joints. This heat is dependent on:

- the speed at which the vehicle is travelling, which has an impact on the friction between the rotating part and the fixed part of the joint;
- the inflation (or deflation) pressure of the air flowing in the fluid circuit between the CTIS and the wheel;
- a duration of use (the total inflation or deflation time).

Improvements have been proposed in order to modify the material of these swivel joints, design joint geometries that are less sensitive to such heating or provide a system for cooling the swivel joint. However, these solutions are more expensive than standard joints and are sometimes complex.

The document US2017/080761 is known, which provides for an adjustment strictly in two predefined steps, and document US2013/325261, in which a single group of tires is inflated in two stages, simultaneously with the inflation of a second group in a single stage.

DISCLOSURE OF THE INVENTION

One of the aims of the invention is to overcome the disadvantages of the prior art, by proposing a CTIS that preserves the service life of the swivel joints.

To this end, a method has been updated for adjusting the tyre pressure of a vehicle by means of a central tyre inflation system (CTIS);

- the vehicle comprising at least a first group and a second group of tyres, each group comprising at least one tyre;
- each group having an initial pressure and a predetermined target pressure corresponding to each group;
- the method involving carrying out a sequence for adjusting the pressure of each group from the initial pressure to the target pressure; the sequence comprising at least one increment for each group, each increment being defined by an air volume to be added to the tyres of the group;

the sequence involving adjusting the pressure of the groups increment by increment, by switching to another group once one increment has been carried out, until each group has reached its target pressure.

In practice, this involves:

adjusting the pressure of the first group in accordance with the first increment of the sequence of the first group;

once the increment of the group has been implemented, adjusting the pressure of the second group in accordance with the increment of the sequence of the second group, and so on until the target pressure is reached.

In this way, only one group at a time is adjusted, thus leaving a rest period for the swivel joints of the other group(s), during which said joints are not loaded and can cool down, even if there is only one increment per group. The method thus makes it possible to prevent the swivel joints from excessively heating and limits the duration of rotation under pressure and thus the wear on said swivel joints.

Nevertheless, the overall duration of the method is not significantly increased as the total amount of air to be added (or removed) is the same as with the prior-art solutions and the duration of the sequence is limited only by the air flow capacity of the CTIS.

If there are several increments per group, then the process is divided into an even greater number of steps, further limiting the heating of the joints. In practice, once the first increment of each group has been implemented, the next increment of each group is implemented, and so on until the target pressure is reached.

Increasing the number of increments per sequence makes it possible to further limit the heating of the joints. In addition, the pressure variation in the tyres of the vehicle is more homogeneous because the groups are inflated gradually, one after the other, thereby improving the handling of the vehicle.

"Group" means sub-assemblies of the tyres of the vehicle, which may comprise either a single tyre or a plurality of tyres that have to be inflated to the same pressure (for example the tyres on both wheels of an axle or a group of axles). It goes without saying that there may be more than two groups.

By way of example, the groups are defined when the CTIS is installed, such as when the pneumatic network is assembled; the tyres of the same group are interconnected. Each tyre can also be connected to the CTIS individually and the groups are defined by programming; the solenoid valves connecting the tyres of a group to the CTIS are controlled together. These two modes can be combined.

The groups can also be modified later, by modifying either the pneumatic network or the programming.

"Initial pressure" means the pressure prevailing within the group before the method is carried out, and "target pressure" means the pressure to be obtained at the end of the method. It goes without saying that initial pressures and target pressures may be different from one group to another.

The initial pressure can be obtained by measuring the pressure or by reading a value stored in a memory of the CTIS. The final pressure can be entered manually, advantageously selected from a list, and preferably by selecting the driving conditions of the vehicle.

The number of increments may be different from one group to another and may possibly be set in advance.

According to a particular embodiment, an end-of-increment pressure is measured at the end of each increment once the increment has been carried out, and is then compared with a predefined increment target pressure.

This step of checking that a target pressure has been reached at the end of each inflation increment for each group allows it to be confirmed that the volume of air supplied is at the programmed level. The detection of a deviation can be taken into account by the algorithm executed by the CTIS.

To reduce the number of pressure sensors fitted on the vehicle, the end-of-increment pressure is measured by means of a pressure sensor of the CTIS by measuring the pressure of a closed volume comprising a volume of the group and part of an internal volume of the CTIS connecting the pressure sensor to said group.

To avoid obtaining, during the method, groups whose pressures do not correspond to the pre-established sequence, an additional group adjustment increment is carried out if the comparison of the end-of-increment pressure with the predefined increment target pressure is greater than a threshold. Drift is corrected as it occurs.

In a first embodiment, the target pressure of each group is stored in a memory of the CTIS for subsequent reuse as the initial pressure of each group. This allows the duration of the method to be shortened since a step of physically measuring the initial pressure is omitted.

According to a second embodiment, the initial pressure of each group is measured by means of a pressure sensor of the CTIS by measuring the pressure of a closed volume comprising a volume of the group and part of an internal volume of the CTIS connecting the pressure sensor to said group. The method according to this second mode is longer than in the first mode but is more precise because it allows any pressure variations that may have occurred to be detected.

In a preferred embodiment, a number of increments of a group is determined from a greater pressure difference between the target pressure and the initial pressure of the group.

A first calculation method involves dividing the pressure difference by a maximum pressure variation per increment.

This maximum pressure variation per increment is directly correlated with the maximum amount of air to be added per increment, and therefore with the duration of use of the swivel joint during each increment. Imposing a maximum pressure variation per increment is therefore equivalent to imposing a maximum joint use threshold per increment, in order to define a joint heating threshold per increment, i.e. a maximum heating limit per increment.

A second calculation method involves converting the pressure difference into an adjustment time using the flow rate of the CTIS, and dividing this adjustment time by a maximum increment time.

Similarly, imposing a maximum increment time is equivalent to imposing a maximum joint use threshold per increment, in order to define a joint heating threshold per increment.

This guarantees that the joints will not be overloaded, regardless of the pressure deviation of each of the groups. It is also possible to calculate a minimum number of increments, for example in order to limit the number of end-of-increment pressure measurements when the additional adjustment steps are carried out.

Advantageously, the sequence of each group comprises the same number of increments. Thus, the pressures are adjusted progressively across all the groups, thereby ensuring stability of the vehicle when in motion. This method also simplifies the programming of the CTIS controller.

In a preferred embodiment, the number of increments is the same for each group and is equal to the largest number of increments determined across all the groups from a pressure difference between the target pressure and the initial pressure of the group. This allows the aforementioned advantages to be combined.

To guarantee a maximum rest time for each joint, the groups are pressure-adjusted in a particular order during one increment and the groups are pressure-adjusted in the same order during subsequent increments.

To ensure the balancing and handling of the vehicle, each group comprises the tyres mounted on the same axle of the vehicle, possibly on a plurality of axles.

The invention also relates to a central tyre inflation system (CTIS) for a vehicle, comprising a controller programmed to carry out a method according to the above-mentioned features.

BRIEF DESCRIPTION OF THE DRAWINGS

FIG. 1 is a diagram illustrating an embodiment of the method according to the invention.

FIG. 2 is a diagram illustrating a vehicle provided with a CTIS carrying out the method according to the invention.

DETAILED DESCRIPTION OF THE INVENTION

With reference to FIGS. 1 and 2, the invention relates to a method for implementing a central tyre inflation system (CTIS) for a vehicle, in which the tyre pressures are adjusted by groups (EM i) of tyres, in order to only load the swivel joints of said groups (EM i) to a limited extent.

A vehicle comprises four axles, for example, the loading and operating conditions of which lead to the following definitions:
   a first group (EM 1) comprising the tyres of the wheels of the first axle;
   a second group (EM 2) comprising the tyres of the wheels of the second axle; and
   a third group (EM 3) comprising the tyres of the wheels of the third axle and of the fourth axle;
   the tyres of each group (EM i) having to be inflated to the same pressure.

The loading and operating conditions, in particular depending on the ground on which the vehicle is moving, allow operating pressures to be defined for each of the groups (EM i).

To aid understanding of the present invention, values given by way of illustration may be as follows:
   the first group (EM 1) has to be inflated to 1.5 bar on soft ground and to 5 bar on a road;
   the second group (EM 2) has to be inflated to 1.5 bar on soft ground and to 5.5 bar on a road;
   the third group (EM 3) has to be inflated to 2.5 bar on soft ground and to 6 bar on a road.

By way of example, the vehicle was previously moving on soft ground, with low tyre pressures, and is now coming up to a road. The tyres must therefore be inflated in order to limit the power consumption of the vehicle and allow it to travel at high speed without any risk of the tyres deteriorating.

In the remainder of the description, therefore, the case in which the tyres have to be inflated will be illustrated, but it goes without saying that the method according to the invention allows the pressure of the tyres to be adapted, i.e. both increased and decreased.

In the preferred embodiment, the CTIS comprises a pressure sensor, and the CTIS controller is programmed to measure, during an initial step (10), the pressure of a closed volume comprising:

a volume of the group (EM i), i.e. the volume of the tyres of this group (EM i); and part of an internal volume of the CTIS connecting the pressure sensor to said group (EM i), i.e. the part of the pneumatic networks connecting the pressure sensor to each of the tyres of the group (EM i).

The measurement is therefore of the average pressure of the group (EM i); it should be noted that the measurement as such interconnects the different tyres of the group (EM i) and thus compensates for potential pressure differences from one tyre to another.

This pressure sensor makes it possible to obtain the initial pressure (P0 i) of each group (EM i) securely and reliably. Using the pressure sensor of the CTIS avoids having a specific sensor at each group (EM i).

This initial measurement makes it possible in particular to detect a puncture if the initial pressure (P0 i) is below the intended operating pressure.

Still within the initial step (10), the user then enters, by means of a human-machine interface (HMI) of the CTIS, the desired target pressure (P1 i). The user can do so by:

pressing one of the ground buttons (I-ter) of the HMI for indicating to the controller the ground on which the vehicle is moving, and pressing the load button (I-ch) on the HMI for indicating to the controller whether the vehicle is empty or fully loaded.

On the basis of the selected ground and the vehicle loading state, the controller selects the target pressure (P1 i) of each group (EM i) within a pre-stored database of target pressures.

To ensure the vehicle travels safely despite the tyres being inflated while the vehicle is in motion, the groups are inflated successively and in increments (DG i-j). Thus, no group (EM i) already has the recommended pressure for travelling on a road, and some groups (EM i) still have the recommended pressure for travelling on soft ground.

The number of increments (DG i-j) can be pre-programmed or be configurable. The number of increments (DG i-j) could be different from one group (EM i) to another, but for simplicity of programming in the example shown the number of increments is the same for each group (EM i). Moreover, inflating the groups (EM i) in the same order in each increment (DG i-j) guarantees an optimal rest time of the joints for each group (EM i).

An arbitrary number of increments allows a simple method to be achieved, but a further development can be provided.

If one group (EM i) has to go from a low initial pressure (P0 i) to a high target pressure (P1 i), the swivel joints of this group will be highly loaded. If the number of increments (DG i-j) is insufficient, the joints may overheat and deteriorate.

The controller therefore generates the difference between the target pressure (P1 i) and the initial pressure (P0 i) for each group (EM i). The greatest pressure difference (DPmax) indicates what the greatest joint load would be among the different groups (EM i), whether measured by time or by air volume. It goes without saying that the calculation of the load on each group (EM i) takes into account the internal volume of the group (EM i), i.e. the volume of each tyre present in the group (EM i) and possibly part of an internal volume of the CTIS connecting the pressure sensor to said group.

This greatest joint load is divided by a maximum use threshold per increment (DG i-j), ensuring that the joint is not loaded beyond the predefined threshold during each increment (DG i-j).

In practice, two calculation methods are envisaged:

either dividing the greatest pressure difference (DPmax) by a maximum pressure variation per increment (DPmax-GP);

or converting the greatest pressure difference (DPmax) into a maximum adjustment time (DTmax) and dividing this time (DTmax) by a maximum increment time (DTmax-GP).

The maximum pressure variation per increment (DPmax-GP) and the maximum increment time (DTmax-GP) are two different expressions of a maximum joint load threshold per increment (DG i-j).

These two methods are based on the same reasoning and can be selected as desired by the programmer of the controller.

The division provided for in each of the above methods provides a minimum number of increments (DG i-j). It is self-evident that this number can be rounded up to the next integer to ensure that each increment (DG i-j) will not overload the joints.

The controller then defines an inflation sequence for each of the groups (EM i) by calculating the air volume (V i,j) to be added within each group (EM i) depending on the number of tyres in the group (EM i), their volumes and the pressure variation to be provided to the group (EM i) during each increment (DG i-j).

In a manner known per se, on the basis of the supply pressure of the CTIS compressor, the air flow rate that can be attained according to the cross section of the pneumatic networks of the CTIS and the internal volume of each group (EM i), the air volume (V i,j) can be calculated:

as a function of a duration (DTG i-j) of each inflation increment (DG i-j), or as a function of a pressure variation (DPG i-j) in each inflation increment (DG i-j).

The number of increments (N) and air volumes (V i,j) is determined in a sequence definition step (20).

With reference to the step (30) of the flowchart, the inflation of the groups (EM i) is then initiated as follows:

the CTIS delivers the intended air volume (V1, 1) for the first increment (DG1-1) of the first group (EM 1); then the CTIS delivers the intended air volume (V2, 1) for the first increment (DG2-1) of the second group (EM 2); then the CTIS delivers the intended air volume (V3, 1) for the first increment (DG3-1) of the third group (EM 3).

The first increment (DGi-1) is carried out for each of the groups (EM i).

The method then continues with the second increment for each of the groups, during step (60) of the flowchart:

the CTIS delivers the intended air volume (V1, 2) for the second increment (DG1-2) of the first group (EM 1); then the CTIS delivers the intended air volume (V2, 2) for the second increment (DG2-2) of the second group (EM 2); then the CTIS delivers the intended air volume (V3, 2) for the second increment (DG3-2) of the third group (EM 3).

The increments are thus carried out one after the other by repeating step (60) until the sequence of each group (EM i) has been carried out and each group (EM i) has reached its target pressure (P1 i).

Advantageously, at the end of each increment (DG i-j), an end-of-increment pressure (P1'i-j) is measured and compared with a predefined increment target pressure (P1'ref i-j). In the event that unforeseen conditions, such as temperature or the malfunctioning of a pneumatic element, have potentially had an impact on the effective inflation of the group (EM i), meaning that the group does not have the expected end-of-increment pressure (P1'i-j), this deviation is noted by the controller.

The controller can then trigger an alert for the driver of the vehicle.

The controller can also trigger an additional increment (AddG i,j) in step (40) of the flowchart, during which the CTIS adjusts the pressure of the group (EM i) until it reaches the expected end-of-increment pressure (P1'ref i-j), in particular if the deviation observed is greater than a predefined threshold. In practice, the controller calculates the additional air volume (Vadd i-j) to be added to or removed from the group (EM i) in order to reach the end-of-increment pressure (P1'ref i-j).

This avoids the pressure imbalances between the different groups (EM i) and guarantees good balancing and good handling of the vehicle.

The measurement by means of the pressure sensor of the CTIS can be fast since it is carried out immediately at the end of the increment (DG i-j). Although the measured pressure is that of the volume comprising a volume of the group (EM i) and part of an internal volume of the CTIS connecting the pressure sensor to said group (EM i), the indication is sufficient to tell whether the increment (DG i-j) has been successful.

Moreover, the method and the CTIS can be designed differently from the examples given, without departing from the scope of the invention as defined by the claims.

For example, the additional adjustment step (AddG i,j) may take place not at the end (30) of each increment (DG i,j) but once all the sequences have been carried out, just before the end (70) of the method.

Instead of using the ground buttons (I-ter) and the load button (I-ch), the target pressure (P1 i) can be entered directly by the user by means of a suitable interface of the HMI.

Furthermore, the technical features of the various embodiments and variants mentioned above can be combined in full or in part. Thus, the method and the CTIS can be adapted in terms of cost, functionalities and performance.

The invention claimed is:

1. A method for adjusting the tyre pressure of a vehicle by means of a central tyre inflation system, CTIS;

the vehicle comprising at least a first group and a second group of tyres, each group comprising at least one tyre; each group having an initial pressure;

a predetermined target pressure corresponding to each group;

the method involving carrying out a sequence for adjusting the pressure of each group from the initial pressure to the target pressure;

the sequence comprising at least one increment for each group; each increment being defined by an air volume to be added to the tyres of the group;

the sequence involving adjusting the pressure of the groups increment by increment, by switching to another group once one increment has been carried out until each group has reached its target pressure, wherein a number of increments of a group is determined from a pressure difference between the target pressure and the initial pressure of the group:

either by dividing the pressure difference by a maximum pressure variation per increment;

or by converting the pressure difference into an adjustment time and dividing this time by a maximum increment time.

2. The method according to claim 1, wherein an end-of-increment pressure is measured at the end of each increment and then compared with a predefined increment target pressure.

3. The method according to claim 2, wherein the end-of-increment pressure is measured by means of a pressure sensor of the CTIS by measuring the pressure of a closed volume comprising a volume of the group and part of an internal volume of the CTIS connecting the pressure sensor to said group.

4. The method according to claim 2, wherein a step of additionally adjusting the group is carried out if the comparison of the end-of-increment pressure with the predefined increment target pressure is greater than a threshold.

5. The method according to claim 1, wherein the target pressure of each group is stored in a memory of the CTIS for subsequent reuse as the initial pressure of each group.

6. The method according to claim 1, wherein the initial pressure of each group is measured by means of a pressure sensor of the CTIS by measuring the pressure of a closed volume comprising a volume of the group and part of an internal volume of the CTIS connecting the pressure sensor to said group.

7. The method according to claim 1, wherein the sequence of each group comprises the same number of increments.

8. The method for adjusting the tyre pressure of a vehicle as claimed in claim 1, wherein said method for adjusting is conducted while the vehicle is in motion.

9. The method according to claim 7, wherein the number of increments corresponds to the largest number of increments determined across all the groups from a pressure difference between the target pressure and the initial pressure of the group.

10. The method according to claim 1, wherein the groups are pressure-adjusted in a particular order during one increment and the groups are pressure-adjusted in the same order during subsequent increments.

11. The method according to claim 1, wherein each group comprises the tyres mounted on the same axle of the vehicle.

12. A central tyre inflation system, CTIS, for a vehicle, comprising a controller programmed to carry out a method according to claim 1.

* * * * *